United States Patent [19]
Rossetti et al.

[11] Patent Number: 5,961,899
[45] Date of Patent: Oct. 5, 1999

[54] VIBRATION CONTROL APPARATUS AND METHOD FOR CALENDER ROLLS AND THE LIKE

[75] Inventors: Dino J. Rossetti, Chapel Hill, N.C.; Stephen F. Hildebrand, Erie, Pa.; John J. Quinn; Mark A. Norris, both of Raleigh, N.C.; Lane R. Miller, Fuquay-Varina, N.C.

[73] Assignee: Lord Corporation, Cary, N.C.

[21] Appl. No.: 08/892,788

[22] Filed: Jul. 15, 1997

[51] Int. Cl.⁶ .............................. B29C 71/00; B65H 18/26
[52] U.S. Cl. .............................. 264/40.1; 72/9.2; 72/11.8; 72/16.9; 72/18.8; 100/47; 100/168; 100/169; 100/170; 100/171; 264/275; 425/141; 425/367
[58] Field of Search .................................. 264/40.1, 175; 425/141, 367; 100/47, 168, 169, 170, 171; 72/9.2, 11.8, 16.9, 18.8

[56] References Cited

U.S. PATENT DOCUMENTS

| | | | |
|---|---|---|---|
| 3,077,800 | 2/1963 | Taylor | 80/32 |
| 3,483,951 | 12/1969 | Bonesho et al. | 188/1 |
| 3,487,888 | 1/1970 | Adams et al. | 181/33 |
| 3,512,475 | 5/1970 | Justus et al. | 100/170 |
| 3,807,678 | 4/1974 | Karnopp et al. | 248/358 R |
| 3,881,335 | 5/1975 | Cook | 72/11 |
| 4,038,848 | 8/1977 | Ichiryu et al. | 72/8 |
| 4,299,162 | 11/1981 | Hartmann et al. | 100/43 |
| 4,311,091 | 1/1982 | Pav et al. | 100/161 B |
| 4,389,933 | 6/1983 | Pav | 100/162 B |
| 4,491,207 | 1/1985 | Boonchanta et al. | 188/299 |
| 4,715,559 | 12/1987 | Fuller | 244/1 N |
| 4,836,342 | 6/1989 | Wolfe | 188/319 |
| 4,907,680 | 3/1990 | Wolfe et al. | 188/299 |
| 4,921,272 | 5/1990 | Ivers | 280/707 |
| 5,004,079 | 4/1991 | Ivers et al. | 188/282 |
| 5,018,606 | 5/1991 | Carlson | 188/267 |
| 5,024,150 | 6/1991 | Brendel et al. | 100/35 |
| 5,038,678 | 8/1991 | Honkala et al. | 100/170 |

(List continued on next page.)

U.S. PATENT DOCUMENTS

| | | | |
|---|---|---|---|
| 5,077,997 | 1/1992 | Wolters et al. | 72/8 |

FOREIGN PATENT DOCUMENTS

| | | |
|---|---|---|
| 502 434 A1 | 9/1992 | European Pat. Off. . |
| 26 13 453 A1 | 10/1977 | Germany . |
| 3627 463 A1 | 2/1988 | Germany . |
| 42 01 327 A1 | 7/1993 | Germany . |
| 1194205 | 6/1970 | United Kingdom . |
| 2290635 | 3/1996 | United Kingdom . |

OTHER PUBLICATIONS

Abstract of Japan 9–174, 122A (Published Jul. 8, 1997).
Robert B. Thielbar, "Supercalender is Logical Extension Of Cross–Direction Profile Control", Pulp & Paper, Jun. 1985.

*Primary Examiner*—Leo B. Tentoni
*Attorney, Agent, or Firm*—Randall S. Wayland

[57] ABSTRACT

A vibration control apparatus (20) and method for a calender (18) for controlling vibration between two or more rolls (ex. 22, 24) which controls vibration induced thickness variations in a medium (27) exiting from the nip. The apparatus (20) includes a frame (19), a first and second rolls (22, 24) mounted relative to the frame (19), and a force generator (32), such as an electromechanical active actuator, servo-hydraulic actuator, controllable semi-active damper, Active Vibration Absorber (AVA), or Adaptive Tuned Vibration Absorber (ATVA), provides cancelling forces to control vibration between the first and second roll (22, 24) thereby, controlling such vibration induced thickness variations in the medium (27). Preferably, the apparatus (20) includes at least one sensor (ex. 42, 42', 42", 42"') for providing a signal representative of a vibration condition of at least one of the first or second roll (22, 24), and preferably both, and a digital controller (50) for processing the signal representative of said vibration condition preferably according to a feed-forward-type control and providing a control signal to a force generator (32). Vertical and/or lateral vibration of the rolls (22, 24) may controlled simultaneously. Likewise, fundamental vibrational frequencies and their harmonics may be controlled individually, or in combination.

29 Claims, 9 Drawing Sheets

| | | | |
|---|---|---|---|
| 5,081,759 | 1/1992 | Schiel | 29/116.1 |
| 5,201,586 | 4/1993 | Zimmermann et al. | 384/247 |
| 5,207,774 | 5/1993 | Wolfe et al. | 137/625.32 |
| 5,231,336 | 7/1993 | van Namen | 318/128 |
| 5,251,863 | 10/1993 | Gossman et al. | 248/550 |
| 5,277,281 | 1/1994 | Carlson et al. | 188/267 |
| 5,284,330 | 2/1994 | Carlson et al. | 267/140.14 |
| 5,285,979 | 2/1994 | Lombaroini | 242/65 |
| 5,310,137 | 5/1994 | Yoerkie, Jr. et al. | 244/17.27 |
| 5,396,973 | 3/1995 | Schwemmer et al. | 188/299 |
| 5,439,366 | 8/1995 | Conrad et al. | 425/151 |
| 5,540,072 | 7/1996 | Nishimura | 72/10.4 |
| 5,590,593 | 1/1997 | Korhonen et al. | 100/93 RP |
| 5,600,982 | 2/1997 | Berger | 72/9.2 |
| 5,615,763 | 4/1997 | Schieber | 198/751 |
| 5,647,237 | 7/1997 | Jungkunz et al. | 72/9.2 |
| 5,647,238 | 7/1997 | Steidl et al. | 72/10.1 |
| 5,771,793 | 6/1998 | Kayser | 100/47 |

VIBRATION CONTROL APPARATUS AND METHOD FOR CALENDER ROLLS AND THE LIKE

FIELD OF THE INVENTION

This invention relates to the areas of rolls, such as in calenders, supercalenders, and systems and methods for controlling vibration thereof.

BACKGROUND OF THE INVENTION

Within the prior art, various means have been developed to counter vibration problems. These include passive Tuned Vibration Absorbers (TVAs), Adaptive TVAs (ATVAs), Active Structural Control (ASC), and Active Isolation Control (AIC), all of which will be briefly described herein.

Passive Tuned Vibrations Absorbers (TVA's) are known devices which find utility in absorbing low-frequency vibration by providing localized vibration reduction at their attachment point. Although, TVAs are generally well adapted for attenuating low-frequency noise, they are generally somewhat limited in range and effectiveness, that is, they are only effective at a particular frequency (fn) or within a narrow frequency range. Therefore, TVAs may be ineffective when the disturbance frequency changes, such that the TVA is not any longer excited at its resonant frequency (fn). Moreover, passive TVAs may be unable to generate proper magnitude or phasing of forces needed to effectively suppress vibration. Furthermore, at low frequencies, TVAs are required to be relatively massive for adequate vibration reduction.

When a wider range of vibration cancellation is needed, various Adaptive TVAs (ATVAs) may be employed. For example, U.S. Pat. No. 3,487,888 to Adams et al. entitled "Cabin Engine Sound Suppresser" teaches an ATVA where the resonant frequency (fn) can be adaptively adjusted by changing the "length" of a beam, or the "rigidity" of a resilient cushioning material. Although, the range of vibration attenuation may be increased with ATVAs, they still may be somewhat ineffective for certain applications, in that their range of adjustment may not be broad enough, or they may not be able to generate large enough forces to effectively control vibration.

Where a higher level of noise and/or vibration attenuation is desired, or multiple vibration frequencies need to be addressed, actively controlled vibration systems may be employed. One particular class of active systems are termed Active Isolation Control (AIC) systems. AIC systems include "active mountings" which are attached between a disturbance source (ex. engine) and its attachment structure (ex. frame, etc.). Active mountings include an actively driven element (actuator, inertial shaker, or the like) which provides appropriately phased active control forces of the proper magnitude and frequency for preventing vibration transmission from disturbance source into the attachment structure. Known AIC systems include the feedforward-type, in which a reference signal(s) from a reference sensor(s) is used to provide a signal(s) representative of a disturbance(s) to a control process. Likewise, error sensors provide error signals indicative of the residual vibration or noise. These reference and error signals are processed by a digital controller to generate output signal(s) of the appropriate phase, magnitude, and frequency, i.e., the anti-vibration signal(s). These anti-vibration signal(s) drive the active mounting(s) to reduce vibration transmission from the disturbance source to structure, thereby resultantly controlling structural vibration or noise at some remote location.

In some applications there may be insufficient space envelope to house the active elements (actuators, etc.) within the mounting. Further, there may be alternate vibration paths into the structure, or the appropriate actuation directions required for good vibration attenuation may be difficult to achieve within the space constraints of a mounting. Therefore, under these circumstances, other types of active vibration control may be implemented, such as Active Structural Control (ASC).

ASC systems utilize Active Vibration Absorbers (AVAs) or Inertial shakers which are actively driven along their acting axes at the appropriate frequency, amplitude, and phase to generate counter inertial control forces at their attachment points. By providing the appropriate frequency, phasing, and amplitude to the control forces, vibration at the attachment point or elsewhere may be controlled. ASC systems may also control acoustic noise at remote locations.

In various processes where rolls, such as calender rolls are utilized, such as in the paper making process, there may be dynamic vibrations of one or more of the calender rolls in the calendar. The term "calender", as it is used herein, refers to any system of two or more rolls through which a medium is passed. Vibration of such rolls may cause defects in quality of the calendered medium which may be objectionable. For example, variations in the thickness along the length of the calendered medium may occur. It also may be the case that the speed of the calendering process may have to be slowed to correct these defects. Simply, it may be desirable to improve the quality of the calendered product. Heretofore, no systems have addressed the problems of variations in thickness of the calendered product due to dynamic vibration of the rolls.

SUMMARY OF THE INVENTION

Therefore, in light of the advantages and drawbacks of the prior art, the present invention is a vibration control system and method for controlling vibration of one or more rolls within a process line, such as in a calender or supercalender. In one aspect, the invention is an apparatus for calendering a medium and comprises a calender frame, a plurality of calender rolls rotatably mounted relative to said frame, and a plurality of force generators which provide cancelling forces to control dynamic vibration between the plurality of calender rolls. The dynamic vibration is applied to effectuate appropriate control of the thickness of the calendered medium, for example, paper, plastic, steel, aluminum, other metals or alloys (sheet or billet), polymer film, laminates, magnetic tape, etc. Further, the force generator preferably includes controllability, such as in an active force actuator (ex. electromechanical, semi-active servo-hydraulic), Active Vibration Absorber (AVA), Adaptive Tuned Vibration Absorber (ATVA), or the like.

Accordingly, in one embodiment, the apparatus comprises at least first and second rolls, at least one error sensor for providing a signal representative of the vibration condition of the one or more of the rolls, a controller for processing said signal representative of said vibration condition and producing a control signal, and force generator means responsive to the control signal for providing cancelling dynamic forces to control vibration of the one or more rolls with the resultant effect of reducing vibration induced thickness variations along the length of the calendered medium.

In a broadest sense, the invention is an apparatus for calendering a medium, comprising a frame, first and second rolls rotatably mounted relative to said frame forming a nip between which the medium is to be is inserted, force generator means for providing cancelling vibrational forces to control dynamic vibration between said first roll and said second roll, and means for controlling said force generator means to adjust the vibration characteristics of said vibration applied between said first and second rolls thereby controlling vibration induced thickness variations in the medium. The means for controlling may be provided by a computer algorithm or via a manual adjustment. In another aspect, relative vertical and lateral vibrations of the rolls may be individually or simultaneously controlled. In another aspect, when generators are attached to at least one roll, overload protection is provided. In yet another aspect, a feedforward type control is implemented which processes frequency information from one or more of the rolls. In all controlled versions of the invention, error sensor information is derived from one or more sensors, such as accelerometers, relative displacement or velocity, or a caliper sensor. Fundamental vibrational frequencies of the roll(s) and/or harmonic thereof may be individually or simultaneously controlled.

In another asepct, the invention includes a method of controlling the thickness of a calendered medium, comprising the steps of feeding a medium between a nip formed between two calender rolls, generating from a reference sensor a reference signal correlated to rotational speed of at least one of said two calender rolls, generating from at least one error sensor an error signal representative of residual vibration between the two calender rolls, processing said reference signal and said error signal within a controller to produce a control signal, and controlling a force generator responsive to the control signal for providing cancelling forces to control dynamic vibration between the two calender rolls to control thickness variations within the medium.

It is an advantage of the present invention vibration control system for controlling roll vibration that it can reduce the variations in thickness along the length of the calendered medium (ex. paper, plastic, steel, aluminum, other metals or alloys (sheet or billet), polymer film, laminates, magnetic tape, etc.) due to vibration of one or more of the rolls.

The abovementioned and further features, advantages, and characteristics of the present invention will become apparent from the accompanying descriptions of the preferred and other embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE INVENTION

Figure 1:
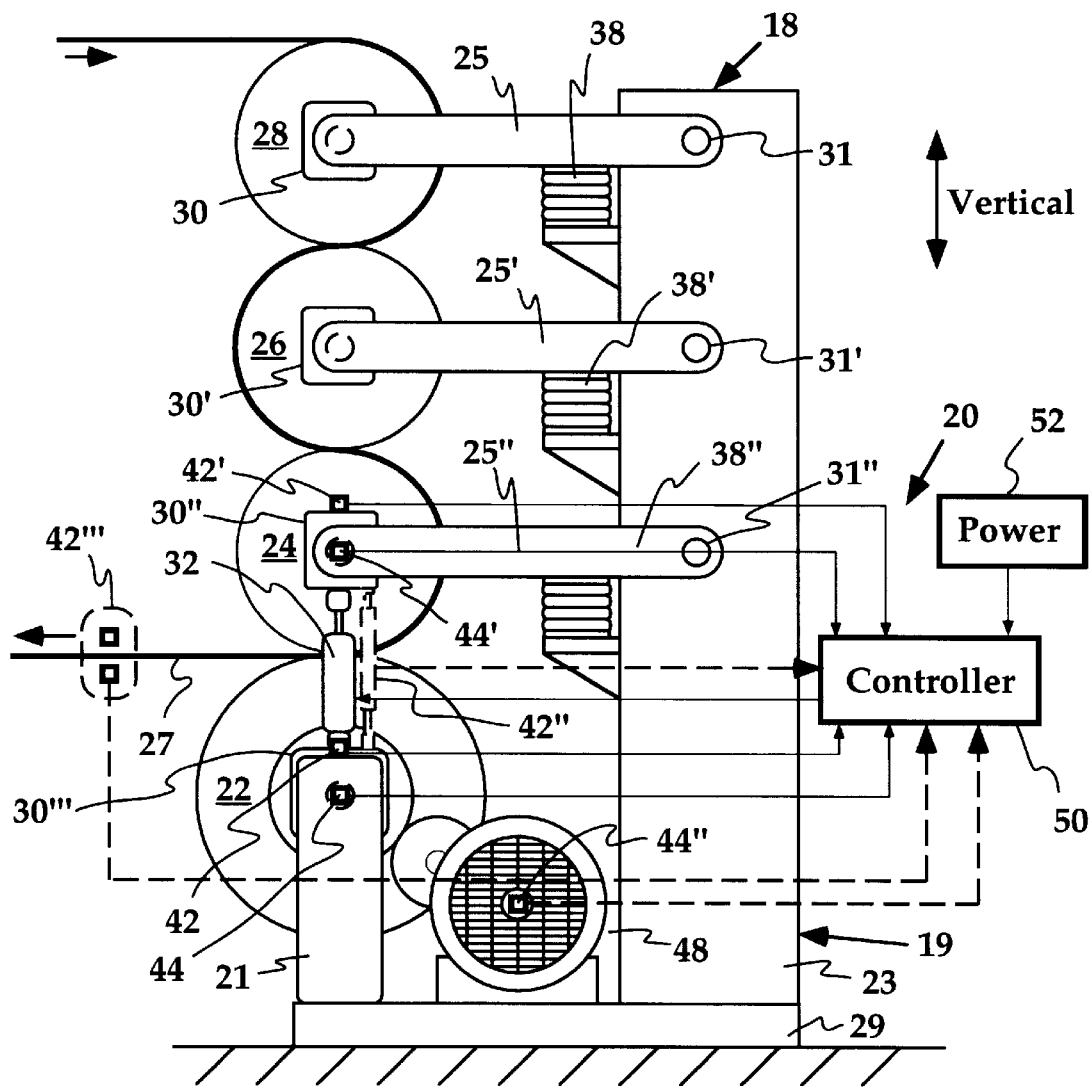
FIG. 1 is a side view of the active vibration control system for controlling dynamic vibration between various, preferably stacked rolls.

Referring now to the Drawings where like numerals denote like elements, in FIG. 1, shown generally at 20, is a first embodiment of the present apparatus invention active calender vibration control system for controlling vibration of one or more rolls, such as calender rolls within a calender or supercalender. This invention has particular applicability for controlling vibration in multiple and stacked calenders and supercalenders within the paper making process. However, it should be understood that in its simplest form, the invention controls vibration of at least one roll along one axis (for example, a vertical axis). Control of this vibration has an effect of controlling variations in thickness or other related property of the end product (paper, plastic, steel, aluminum, other metals or alloys (sheet or billet), polymer film, laminates, magnetic tape, etc.). In a more complex aspect of the invention, vibration is controlled along multiple axes, for example, simultaneously along both a vertical and lateral axis.

The active calendering system 20 is useful in a calender 18 which includes a frame 19 (comprising base 29 and first and second uprights 21, 23) for supporting a plurality of calender rolls, of which there are at least two or more, which in this example, are shown stacked vertically upon one another. However, without loss of generality, it should be recognized that horizontally oriented rolls may be controlled in a similar fashion. In the paper making process, the calender rolls comprise a king roll 22 with a queen roll 24 stacked on top thereof. The calender 18 may also include an intermediate roll 26 and a top roll 28. Each are cylindrically shaped and measure between about 4–30 ft. long. In the paper making industry, these calenders 18 compress the medium (paper) between the nips of the rolls giving it a smoother feel and surface appearance.

In the illustration herein, four rolls are shown, but it should be understood that the present invention will find applicability in controlling vibration between two, three, four, and five or more rolls and is effective at controlling fundamental frequencies as well as harmonics simultaneously. As mentioned above, vibration of one or more of the various rolls 22, 24, 26, 28 can impart undesirable variations in the medium thickness (referred to herein as caliper). The present invention reduces caliper thereby, in the case of paper, positively affecting quality and printability of the end product. The speed of the medium 27 exiting between the king and queen rolls is typically about 1240 meters/minute which corresponds to a king roll frequency of about 7.5 Hz and speed of the queen, roll 1 and roll 2 of about 9.2 Hz. As will become apparent, both of these vibrational frequencies and one or more harmonics thereof may be controlled simultaneously.

Each cylindrical calender roll includes a bearing member housed within a bearing housing or cap 30, 30', 30", 30'" or other like support on either end thereof (only one end is shown). The bearings within caps 30, 30', 30", 30'" rotatably support the rolls 22, 24, 26, 28 relative to the frame 19. The upper most bearing caps 30, 30', 30" preferably attach to pivot arms 25, 25', 25" which are pivotally mounted at pivots 31, 31', 31" relative to second upright 23. Cap 30'" is preferably mounted to, and supported by, first upright 21. Air bellows 38, 38', 38" or other slow acting actuators may be used to selectively raise or lower the calender rolls 24, 26, 28 or adjust the static loading therebetween. The medium 27, such as a paper sheet or the like, is inserted between the various rolls 22, 24, 26, 28 and ultimately exits between the king roll 22 and the queen roll 24 after being rolled through the various nips formed by the roll stack. Variations in the rolled thickness of the medium (along its length) may occur due to vibrations of any one or more of the rolls 22, 24, 26, 28. The present invention controls the vibration of one or more of the rolls 22, 24, 26, 28, either singly or in combination, thereby resultantly controlling relative vibration between the rolls and reducing vibration-induced variations in thickness of the calendered medium 27.

In particular, in a first aspect, relative vibration along a first axis (example: the vertical direction as indicated by the arrow shown) between the king 22 and queen 24 rolls is actively controlled. As will become apparent, relative vibration between any two, or more than two, of the various stacked rolls 22, 24, 26, 28 may be simultaneously controlled. For example, vibration between the king roll 22 and queen roll 24 may be controlled, and with addition of additional force generators between the rolls, at the same time between the queen 24 and intermediate 26 rolls and between the intermediate 26 and top roll 28 (ex. see FIG. 3).

The roll vibration control system 20 preferably utilizes error sensor information from at least one error sensor (such as an error sensor 42, 42', or 42") for providing a signal representative of a vibration condition of at least one of a first calender roll (ex. the king roll 22) in which case, sensor 42 would preferably provide vertical acceleration and the second calender roll (ex. the queen roll 24) in which case sensor 42' would preferably provide vertical acceleration. The preferred control process is a feedforward type which requires an input signal representative of the rotational speed of one or more of the rolls. In this embodiment, vertical vibration between the king and queen rolls (a first and second roll) is controlled. Therefore, an input signal representative of the rotational speed of at least one of the first and second calender rolls (example: the king roll 22) and preferably both of the first and second calender rolls (ex. king and queen rolls 22, 24) is desired. Preferably, the input sensors 44, 44' would provide the rotational speed of the king roll and queen roll. Sensors 44, 44' may be tachometers or other sensors capable of providing a signal representative of the rotational speed of the one or more rolls. Alternatively, a speed sensor 44" on the drive motor 48 may be used to provide an input signal for the control process by utilizing known gear ratios to determine the speed of each roll 22, 24.

The error signals from error sensors 42, 42' representative of vertical acceleration of king roll 22 and queen roll 24, are preferably integrated twice and subtracted to provide a relative displacement estimate between the king and queen rolls 22, 24. Alternatively, relative information such as relative displacement or velocity may be obtained from a relative vibration sensor 42" which provides information indicative of relative vibration between the rolls 22, 24. The relative vibration information may be obtained directly from a displacement sensor, such as a Linear Variable Displacement Transducer (LVDT) or from a once-integrated signal from a Linear Velocity Transducer (LVT). In another option, the error signal may be provided by a caliper sensor 42'" which measures the thickness of the medium 27 at a point downstream from exiting the rolls 22, 24. When the caliper sensor 42'" or relative information sensor 42" are used, the error sensors 42, 42' may be eliminated.

A preferably digital controller 50 processes the signal representative of vibration condition of at least one of the rolls and produces a control signal which is provided to the force generator 32. Only one generator is shown, although it should be recognized that there are preferably one generator interconnected at each end of the roll(s). The force generators 32 are preferably "active actuators", although in some applications, an "active damper", such as an electro-mechanical semi-active damper, Magnetorheological (MR) damper, or Electrorheological (ER) damper may suffice. Notably, an active actuator may provide positive active forces in two directions (extension and compression), while, generally, an active damper only generates disspative forces. Herein, the term "active generator device" will refer to both "active actuators" and "active dampers". Preferably, the controller 50 takes tachometer inputs from both reference sensors 44, 44' and from both error sensors 42, 42' (or optionally from sensor 42" or 42'") and processes them according to a feedforward algorithm, such as the filtered-x Least Means Square (LMS) algorithm, or other like gradient adaptive algorithms, to determine the applied control signals.

The force generator 32 is preferably an active force generator, such as P/N AFX 460-100 available from Motran Industries, Inc. of Valencia, Calif. and is capable of producing dynamic forces in the frequency range between 7 Hz and 28 Hz and of sufficient magnitude to cancel the vibration. The force generator preferably has the ability to accommodate transient relative motions between the rolls 22, 24 of about 0.25 inch. The preferred active actuator 32 accomplishes this with combinations of springs and flexures (See FIG. 7). The transient relative motions to be accommodated are due to imperfections/debris in the medium (ex. paper) which causes the second roll (ex. the queen roll 24) to jump vertically relative to the first roll (ex. king roll 22). Alternatively, as mentioned, the force generator 32 may comprise a semiactive, MR, or ER damper or the like, such as described in commonly assigned U.S. Pat. Nos. 3,807, 678, 4,491,207, 4,836,342, 4,907,680, 4,921,272, 5,004,079, 5,018,606, 5,207,774, 5,396,973 5,284,330 or 5,277,281. Moreover, the force generator 32 may be servo-hydraulic (See FIG. 6). Other appropriate force generators may replace those specifically mentioned herein, as will be apparent to those of ordinary skill in the art. The force generator 32 is preferably responsive to a control signal for providing vibrational forces of the appropriate magnitude, frequency, and phase to minimize dynamic vibration between the first calender roll (ex. the king roll 22) and the second calender roll (ex. queen roll 24) thereby resultantly controlling and minimizing the thickness variations in the calendered medium 27 exiting between the nips of the king and queen rolls 22, 24. Power for the controller sensors and active generator devices is provided by external power source 52.

Figure 2A:
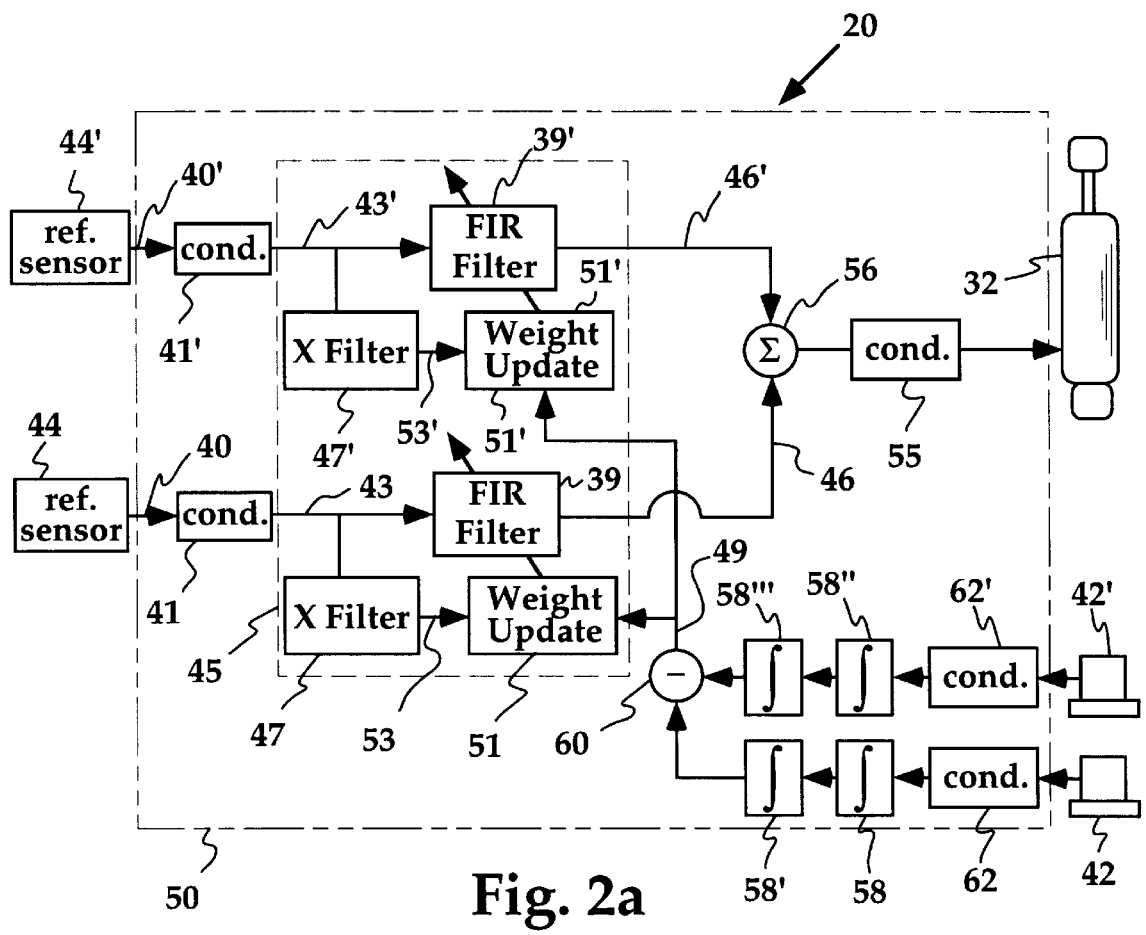
FIG. 2a is a block diagram illustrating one type of control for the active vibration control system for rolls.

FIG. 2a illustrates a preferred control architecture for the actively controlled calendering system 20. Control elements within controller 50 implement a feedforward control architecture. First, reference signals 40, 40' are derived from reference sensors 44, 44' which are representative of the rotational speeds of the king and queen rolls 22, 24 (FIG. 1). These reference signals 40, 40' are conditioned in conditioner steps 41, 41' by the appropriate amplifiers, phase locked loop, and filters (ex. high, low, or band pass filters) to remove unwanted frequency information and other noise. These clean reference signals 43, 43' preferably representative of the fundamental vibrational mode of the king and queen rolls 22, 24 (FIG. 1) (but which may be multiplied up to derive their harmonics) are provided to the control process 45. Within the control process 45, the clean reference signals 43, 43' are convolved with Adaptive FIR filters 39, 39' to derive output (control) signals 46, 46'. The filter weight coefficients for each of control filters 39, 39' are preferably updated via a weight update method 51, 51', such as the aforementioned filtered-x LMS, or any other like gradient descent methods. A further description of the filtered-x algorithm may be found in commonly assigned GB 2,290,635 A by Southward et al. entitled "Active Control of Noise and Vibration."

Outputs from the X filters 47, 47' and clean error signal 49 are input to the weight update method steps 51, 51'. The X filter outputs 53, 53' are derived from convolving the clean reference signal 43, 43' with the X filters 47, 47'. The X filters 47, 47' contain the frequency response estimate between the active generator device 32 and sensors 44, 44'. The update process periodically recalculates the control filter weights for the FIR filters 39, 39' thereby ensuring that any change in the vibration characteristics or speed will be appropriately adapted to. The control signals 46, 46' are summed at summing junction 56 and are also appropriately conditioned in output conditioners 55 (which may also include appropriate amplifiers and filters). Ultimately, the filtered and appropriately amplified control signal is provided to control the at least one force generator 32. The clean error signal 49 representative of relative displacement is provided by taking the vertical acceleration signals from error sensors 42, 42' and integrating each signal twice in integrators 58, 58', 58", 58''' and then subtracting the signals at subtract junction 60. The error path may also include conditioning, such as amplification and filtering provided in conditioner 62, 62'. Although, the control process illustrated uses FIR filters with an filtered-x LMS-based update, other types of control filter architectures, such as IIR filters and other update algorithms could be used.

Figure 2B:
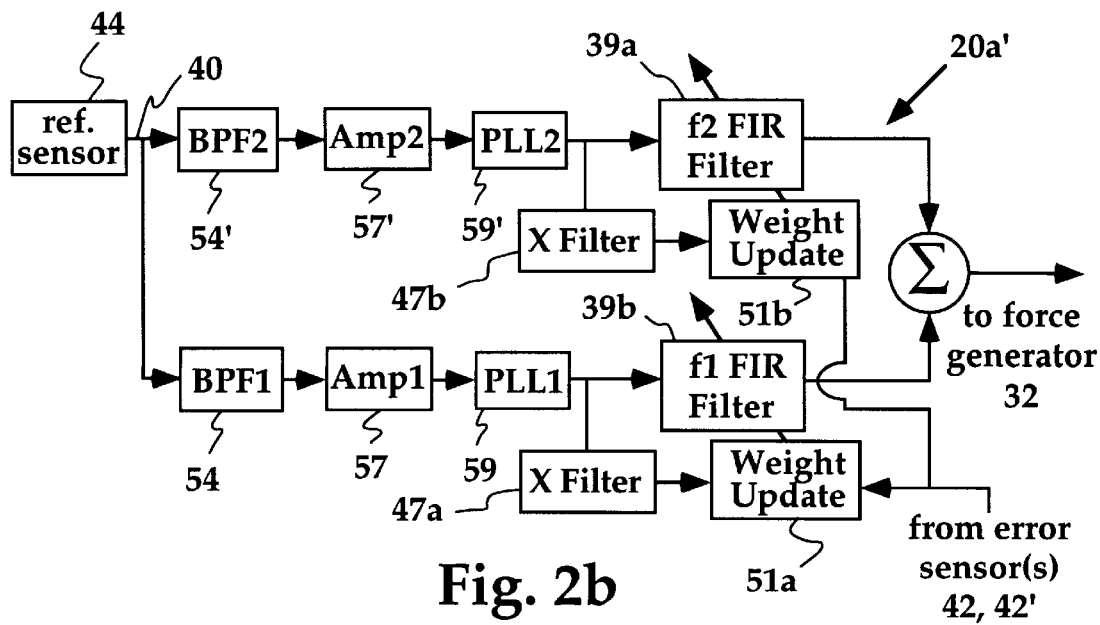
FIG. 2b is a block diagram illustrating control of multiple disturbance frequencies for the active vibration control system.

FIG. 2b illustrates another block diagram of an embodiment of actively controlled system 20a' which controls multiple disturbance frequencies. For example, a reference signal 40 is provided by a reference sensor 44. That signal 40 is passed through a first band pass filter 54 and a second band pass filter 54' such that a first frequency f1 is processed within a first processing path and a second higher frequency f2 (which may be a harmonic) is processed within a second path. Each filtered signal is amplified in Amp1 57 and Amp2 57' and then passed through a phase-locked loop PLL1 59, PLL2 59' which locks onto the appropriate signal frequency f1 or f2 present. The clean signals exiting from the PLL1 59 and PLL2 59' are convolved with f1 FIR control filter 39b and f2 FIR control filter 39a to produce a output signal for each path. The signals are then summed to provide the signal to the force generator 32. For clarity, output conditioning is not shown. It should be recognized that some filtering and amplification would be required. The signals from PLL1 59 and PLL2 59' are convolved with X filter 47a, 47b to produce X filter information. This X filter information, along with information from error sensors 42, 42' is used by weight update 51a, 51b, such as a filtered-x update method, to update the weight coefficients of the adaptive control filters 39a, 39b.

Figure 3:
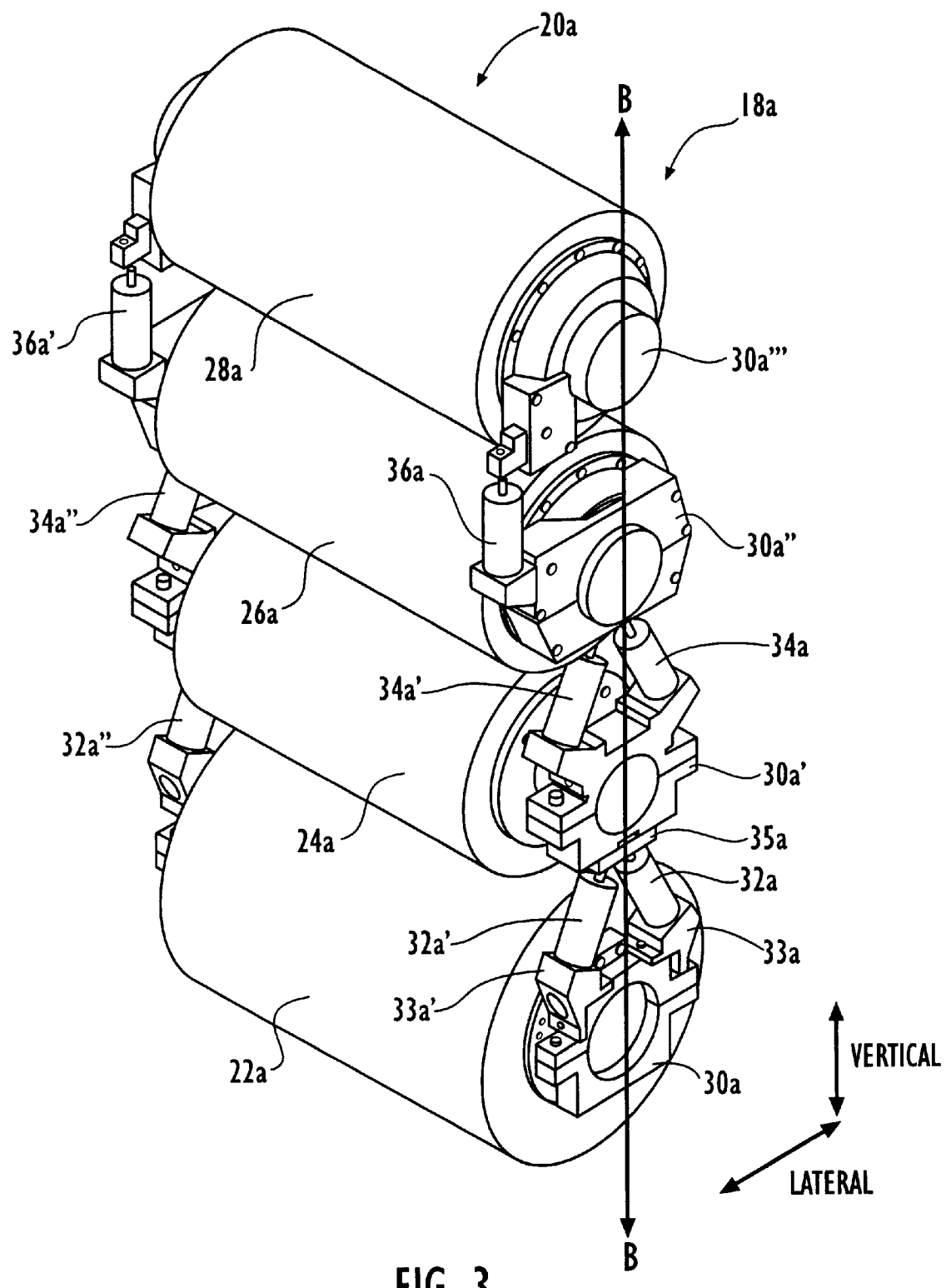
FIG. 3 is a isometric view of another embodiment of an active vibration control system for controlling vibration between rolls, such as between stacked rolls in a supercalender.

FIG. 3 illustrates a preferred embodiment of actively controlled system 20a for a calender 18a which comprises all the elements as compared to FIG. 1 embodiment. Notably, the pivot arms are not shown for clarity. The main difference is that some of the force generators, and specifically those generators attached between the king roll 22a and the queen roll 24a are canted at approximately a 25° angle and, thereby, provide force generation capability to control vibration of the various calender rolls in both the vertical and lateral directions. For example, two force generators, preferably active force actuators, are located and attached at each end of the king roll 22a and are each canted in opposite directions. The first force generators 32a, 32a' are each canted approximately 25 degrees out at their bottom ends from an axis B—B intersecting the ends of bearing caps 30a, 30a', 30a", 30a'''. Therefore, the first force generators 32a, 32a' are capable of generating canceling forces which have vertical and lateral force components. Likewise, the force generators (see 32a") at the other end are arranged in a similar fashion. Preferably, force generators 34a, 34a', 34a" and a fourth actuator mirroring 34a are located and attached between the queen roll 24a and intermediate roll 26a and are also preferably canted at the some angle (preferably 25°) to also provide dynamic vertical and lateral forces. The force generators 36a, 36a' shown between the intermediate roll 26a and the top roll 28a are directed to control vertical forces only. Although, if additional control were required, these rolls 26a, 28a could include twin canted actuators therebetween as well. It is preferable that the force generators 32a, 32a', 32a", 34a, 34a', 34a", 36a, 36a' be actively driven actuators (for example, the above-mentioned Motran actuators). With active actuators arranged in a canted orientation, a dynamic force vector can be created in any direction along any plane which is coplanar with the ends of bearing caps (ex. 30a, 30a', 30a", 30a'''). It should be understood that in all the embodiments herein, there are preferably an equal number of force generators on either end of the rolls which are a mirror image of the generators on the opposite end of rolls 22a, 24a, 26a, 28a (ex. see generators 32a", 34a", 36a' shown). In each case, the generators (such as 32a, 32a') preferably attach between lower brackets (such as 33a, 33a') and upper bracket 35a which are preferably secured to the bearing caps (ex. 30a, 30a'). A description of the preferred actuator may be found with reference to FIGS. 9 and 10.

Figure 4:
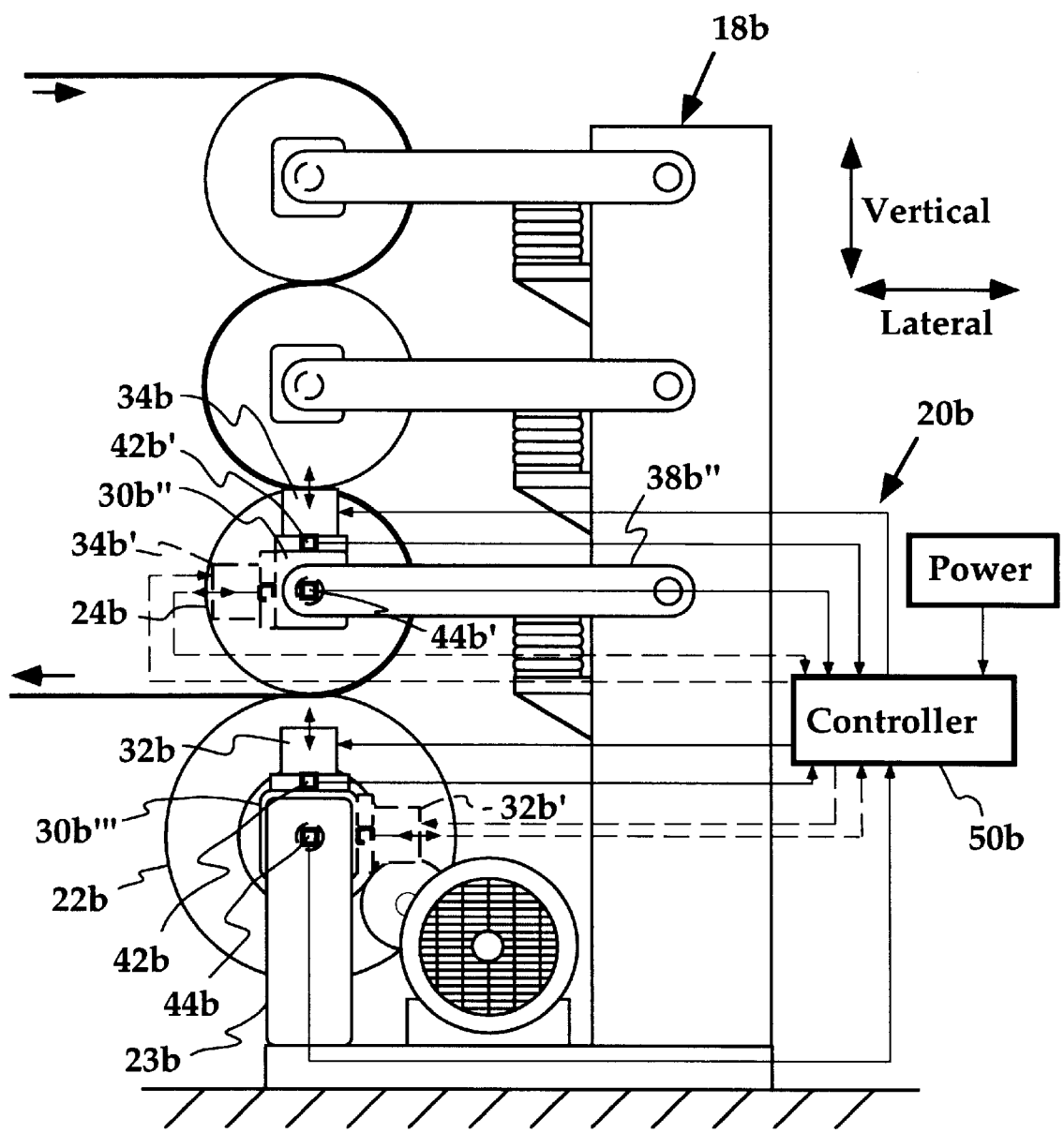
FIG. 4 is a side view of another embodiment of an active vibration control system including active vibration absorbers for controlling vibration between the rolls.

FIG. 4 illustrates another embodiment of calender vibration control system 20b for actively controlling vibration in a calender 18b where the force generators are comprised of a plurality of Active Vibration Absorbers (AVAs) 32b, 34b which are attached to the bearing (housings) caps 30b", 30b''' at either ends of the king and queen rolls 22b, 24b. The AVAs (ex. 32b, 34b) are preferably actively driven, via appropriate command signals, at the fundamental vibrational frequency of the king and queen rolls 22b, 24b, but may be driven at harmonic frequencies simultaneously. Vertical forces are generated which are in anti-phase (180° out of phase) with the vertical vibration of the rolls 22b, 24b. In particular, the AVAs 32b, 34b are vibrated at the appropriate phase, amplitude, and frequency to provide cancelling vibrational forces to minimize relative displacement between the rolls 22b, 24b at the fundamental disturbance frequency. Error signal information (ex. vertical acceleration) is derived from error sensors 42b, 42b', such as accelerometers. Reference signal information for one or more of the rolls is derived from reference sensors 44b, 44b', such as tachometer sensors. These plurality of reference signals (preferably one for each calender roll) and plurality of error signals (preferably two per end representative of vertical vibration) derived from vertical sensors 42b, 42b' located on or adjacent to the bearing caps 30", 30'" are provided to controller 50b through the appropriate cables (indicated as lines with arrows). The controller 50b processes the reference signal and error signal information to derive a plurality of control signals. Again, the error and reference signal information are used to update the control process, preferably according to the aforementioned feedforward-type filtered-x LMS algorithm to minimize vibration (as described with reference to FIG. 2). The plurality of control signals are provided to drive the AVAs 32b, 34b to appropriately absorb vibration of the various rolls 22b, 24b. Alternatively, or in addition, AVAs, such as laterally-acting AVAs 32b', 34b' may be added to control vibration of the rolls, such as the king and queen roll 22b, 24b in the lateral direction. One AVA (ex. 32b, 34b) which may be utilized with the present invention is illustrated with reference to FIG. 7. Other known inertial shaker devices can be readily interchanged.

Figure 5:
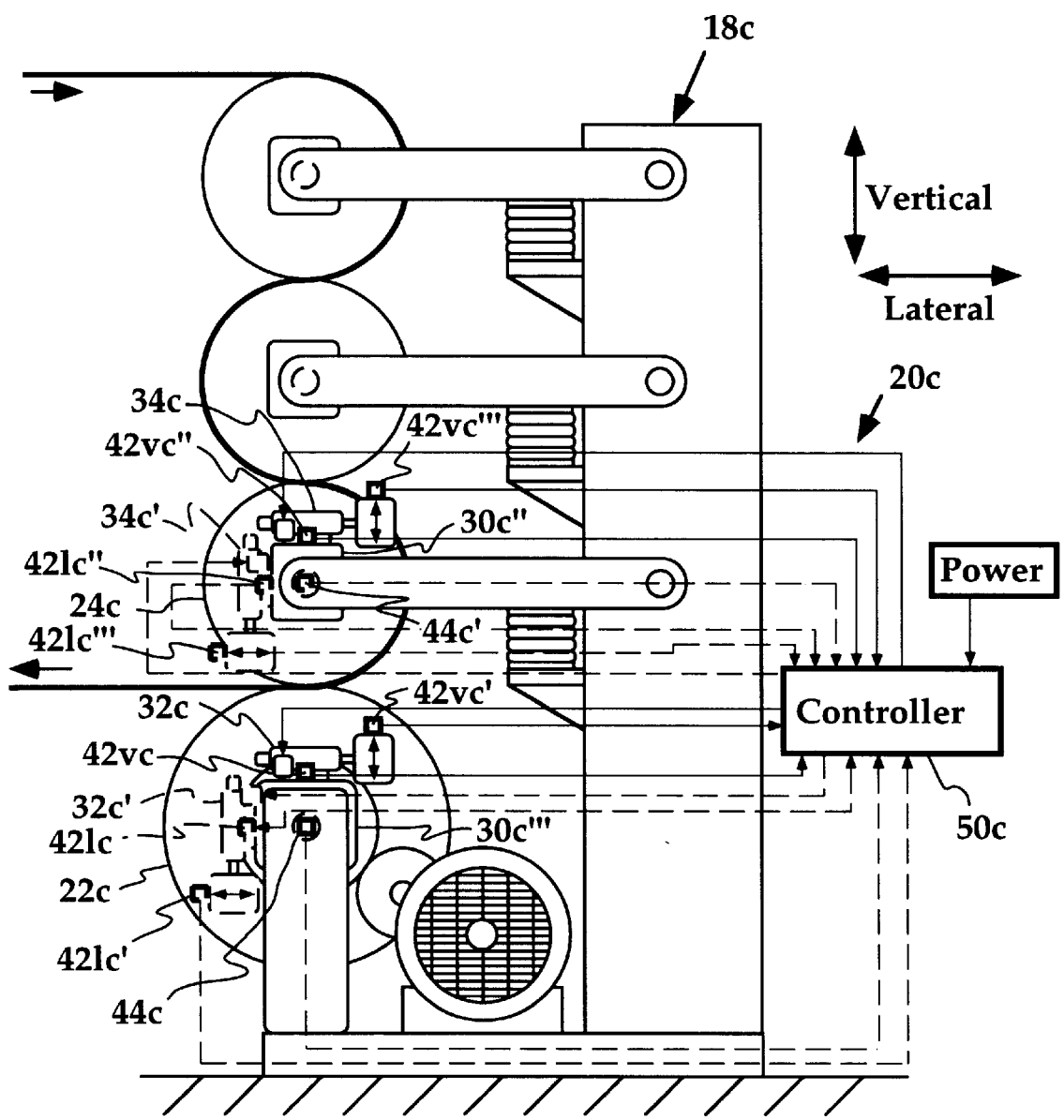
FIG. 5 is a side view of another embodiment of an active vibration control system including Adaptive Tuned Vibration Absorbers (ATVAs) for controlling vibration between the rolls.

FIG. 5 illustrates another embodiment of calender vibration control system 20c mounted on calender 18c which includes Adaptive Tuned Vibration Absorbers (ATVAs) 32c, 34c as the force generators. The ATVAs 32c, 34c have the ability to have their resonant frequency controlled such that it tracks the disturbance frequency. U.S. Pat. No. 3,487,888 to Adams et al. entitled "Cabin Engine Sound Suppresser" describes one ATVA where a weight is mounted on an end of a beam having an adjustable length (hence an adjustable stiffness). By adjusting the stiffness, via changing the length of the beam, the resonant frequency of the absorber is changed. By appropriately sizing the ATVAs 32c, 34c, and appropriately adjusting the resonant frequency of the ATVAs 32c, 34c, the vibration of the rolls at the end may be absorbed, thereby cancelling vibration of the rolls 22c, 24c.

In particular, the ATVAs 32c, 34c are preferably mounted on the bearing housing caps 30c", 30c'" at either end of the rolls (only one end shown). Also, for example, ATVAs 32c, 34c are preferably appropriately tuned to minimize the vibration at the bearing caps 30c", 30c'". Vibration at vertical acceleration sensors 42vc, 42vc" located at the base of ATVAs 32c, 34c and similar vertical acceleration sensors 42vc', 42vc'" located on the ATVA mass provide signals of vertical acceleration thereat. The phase between these signals (ex. between 42vc and 42vc') is determined and the control process attempts to maintain that phase relationship at about 90°. The control appropriately adjusts the beam length, and, thus the tuned frequency to maintain this 90° phase relationship. This ensures that the tuned absorber is operating at its resonance. An example of control of such an ATVA may be found in U.S. Pat. No. 3,483,951 to Bonesho et al. entitled "Self Optimizing Vibration Dampers."

Optionally, tachometer sensors 44c, 44c' may be used to provide frequency information regarding the rotational speeds of king and queen rolls 22c, 24c to be used in a simple open-loop type control of the ATVA's 32c, 34c. In this type of control, a tach sensor 44c, 44c' provides a sync signal to the controller 50c. The controller extracts a corresponding position signal from a lookup table or equation and moves the mass to a predetermined location based upon the operating frequency determination. In this open-loop scenario, sensors 42vc, 42vc', 42vc", 42vc'" would not be needed.

In a yet simpler embodiment, the position of the tuning mass would be adjusted manually by the operator such that the tuning mass of the ATVA resonates at the appropriate frequency. This adjustment may be via a calibrated scale or the like, where each position of the tuning mass would be calibrated to a specific operating frequency. For example, the motor 96c may be exchanged with a simple calibrated knob, such that turning it adjusts the position of the mass 72c. As long as the frequency variations are minimal, this type of manual control means may be adequate. Notably, ATVAs may prove to be more massive than fully active options, as they do not include active force augmentation. In another ATVA variant, the position of the ATVA mass may be manually adjusted via electromechanical means, such as by rotating a motor 96c connected to the shaft 95c of the ATVA 32c, 34c by way of an appropriately calibrated manual dial connected to a voltage divider, or the like. In all ATVA embodiments, lateral force generators, such as laterally acting ATVAs 32c', 34c' may be used in combination with the vertical ATVAs 32c, 34c to minimize both vertical and lateral vibration. Similar controls and sensors (such as sensor 42lc, 42lc', 42lc", 42lc'") would be needed as compared the afore-mentioned vertical ATVA masses.

Figure 6:
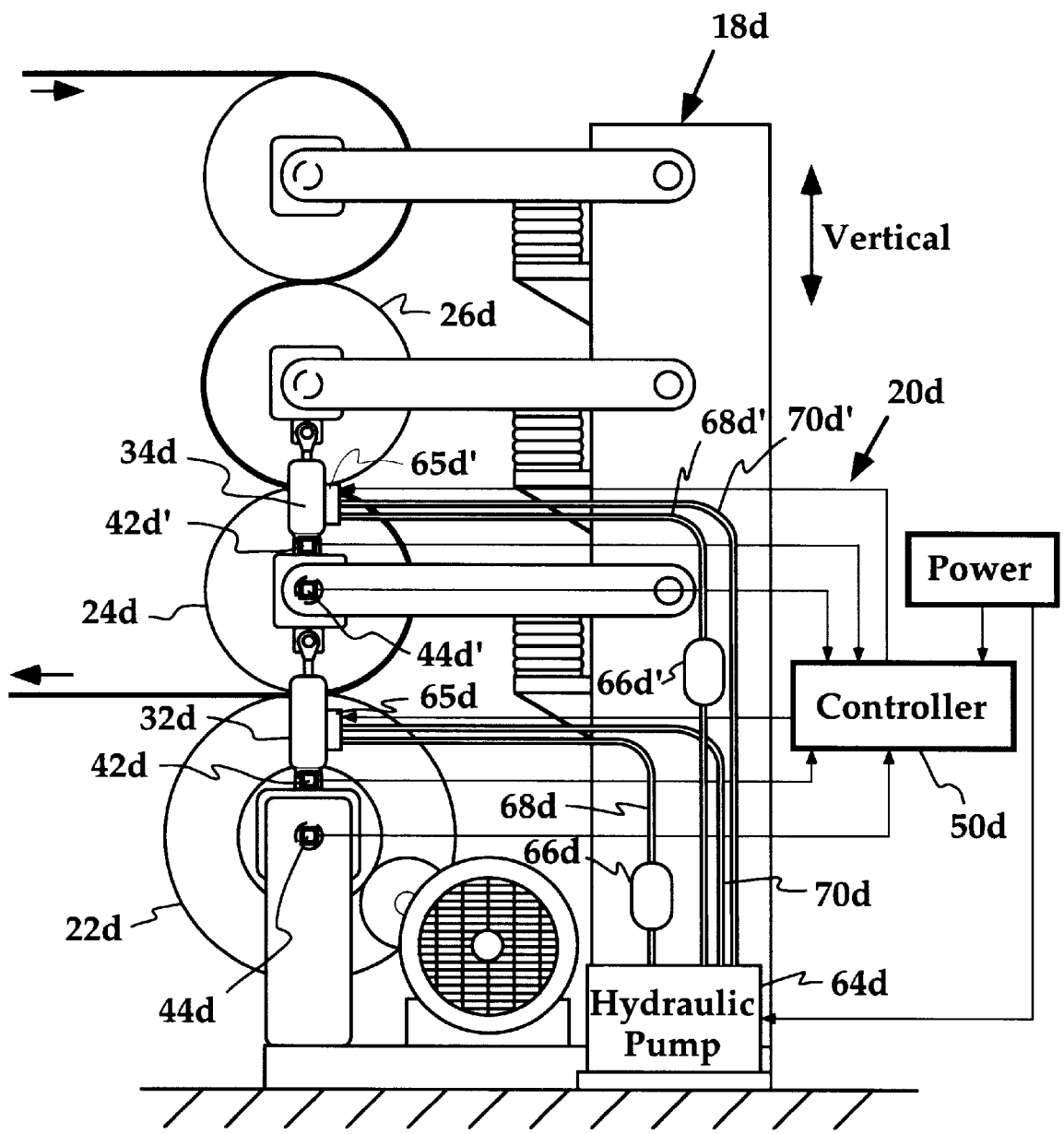
FIG. 6 is a side view of another embodiment of an active vibration control system including hydraulic actuators for controlling vibration between the rolls.

FIG. 6 illustrates another embodiment of calender vibration control system 20d within a calender stack 18d which includes hydraulic servo-actuators 32d, 34d as the active force generators. Hydraulic pump 64d supplies hydraulic fluid under pressure to accumulators 66d, 66d' which act to minimize pressure variations in the supply lines 68d, 68d'. Supply lines 68d, 68d' supply fluid to servo-valves 65d, 65d' integral within hydraulic actuators 32d, 34d. Return lines 70d, 70d' return the hydraulic fluid to pump 64d. The controller 50d preferably processes the error sensor information from vertical acceleration sensors 42d, 42d' and reference information from tachometers 44d, 44d' to derive control signals. The control signals drive the servo-valves 65d, 65d' and, thus, dynamically oscillate the hydraulic actuators 32d, 34d at the appropriate amplitude, phase, and frequency to control vertical vibration between the rolls 22d, 24d, 26d. It should be understood that any of the error sensor information derived in the previous embodiments may be used for control of any of the other force generators described herein, even though specific sensor information is shown relative to each embodiment. For example, each of the afore-mentioned embodiments may take information from accelerometers, displacements, velocity or caliper sensors or combinations thereof, as well as from reference sensors.

Figure 7:
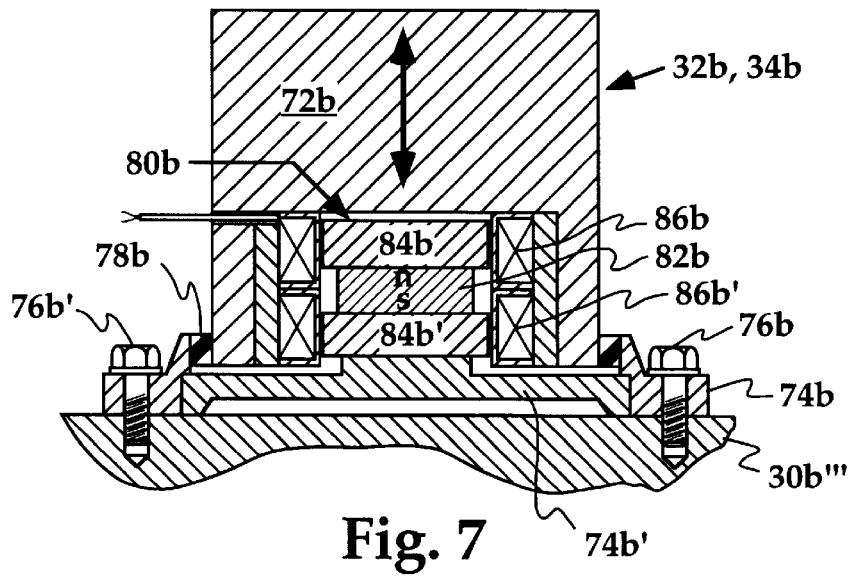
FIG. 7 is a cross-sectioned side view of one embodiment of Active Vibration Absorber (AVA)

FIG. 7 illustrates an embodiment of AVA, such as 32b, 34b that may be used in the roll vibration control system described with reference to FIG. 4. The AVA 32b, 34b is comprised of a base 74b which attaches to the bearing cap 30b", 30b'" or other member where dynamic vibration produced by actively driving the AVA 32b, 34b will be translated into the rolls 22b, 24b, such as the pivot arm 38b'" or frame upright 23b. A tuning mass 72b is flexibly mounted relative to the base 74b by a flexible member, such as an elastomeric spring 78b, flexible plate, coils spring, or the like. Drive means, such as a magnet and coil assembly 80b provide the motive force to dynamically vibrate the AVA 32b, 34b. High strength magnet 82b and magnetically-soft pole pieces 84b rigidly attach to the inner base plate 74b'. Likewise, coils 86b, 86b' are rigidly secured to the tuning mass 72b and move therewith. Electrically energizing circumferentially wound coils (which are connected in series) in an oscillatory fashion (at the cancellation frequency) creates a magnetic field which dynamically interacts with the passive standing field created by permanent magnet 82b, thereby causing the mass 72b to vibrate and produce inertial absorbing forces (as indicated by the arrow).

Figure 8:
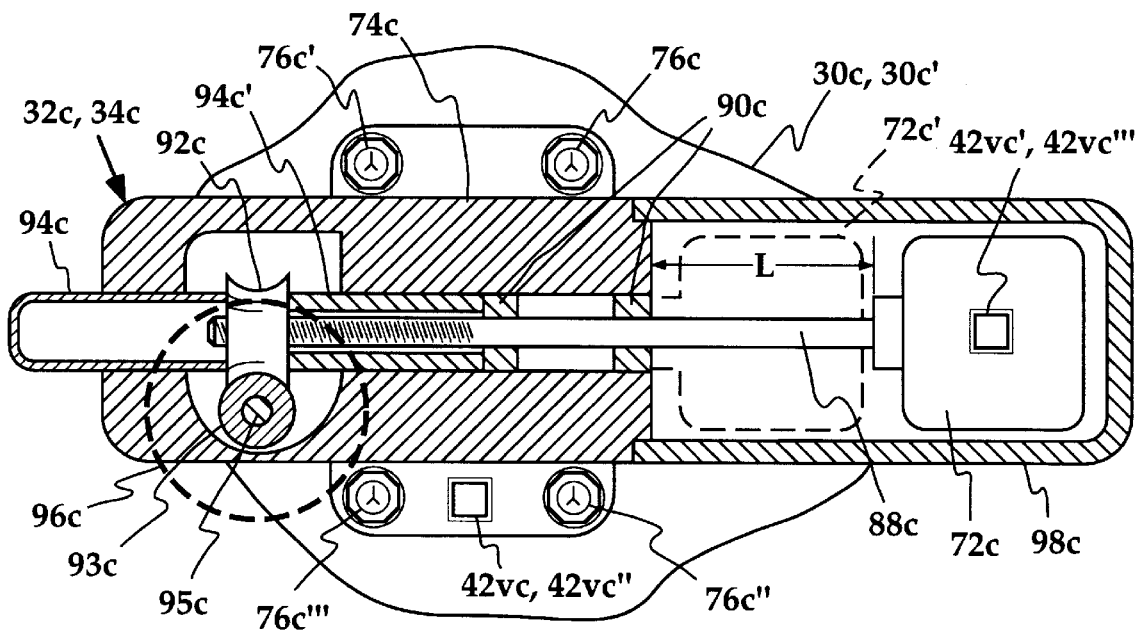
FIG. 8 is a cross-sectioned top view of one embodiment of Adaptive Tuned Vibration Absorber (ATVA)

FIG. 8 illustrates an ATVA 32c, 34c such as is described with reference to FIG. 5. The ATVA 32c, 34c is comprised of a rigid base 74c which is attached to the bearing caps 30c", 30c'" by way of fasteners 76c—76c'". A beam 88c is supported relative to base 74c by bushings 90c. Tuning mass 72c is secured to the end of beam 88c by appropriate means, such as threading. Notably, mass 72c and beam 88c comprise an absorber which can be tuned to resonate at different frequencies by changing the length L of the exposed section of the beam 88c. More or less beam 88c is exposed via sliding the beam 88c back and forth through bushings 90c, thereby changing the length L. The dotted outline 72c' illustrates the location of the tuning mass 72c at its retracted position, while the mass 72c is currently illustrated in its fully extended position. A worm gear 92c is threadedly mounted on beam 88c and retained from axial movement by axial stops 94c, 94c' which provide axial restraint, yet allow rotation of the worm gear 92c. A motor 96c provides the power to translate the beam 88c. A worm 92c securely mounted on shaft 95c of motor 96c, when rotated, consequently also rotates the worm gear 92c. This, in turn translates the beam 88c back or forth depending upon the direction of rotation of the motor 96c. An optional sheath 98c may cover the vibrating mass 72c. The accelerometers 42vc, 42vc" are attached somewhere on base 74c to pick up vertical vibration of the base 74c, while accelerometers 42vc', 42vc'" are attached on the top of mass 88c to pick up vertical vibration thereof.

Figure 9:
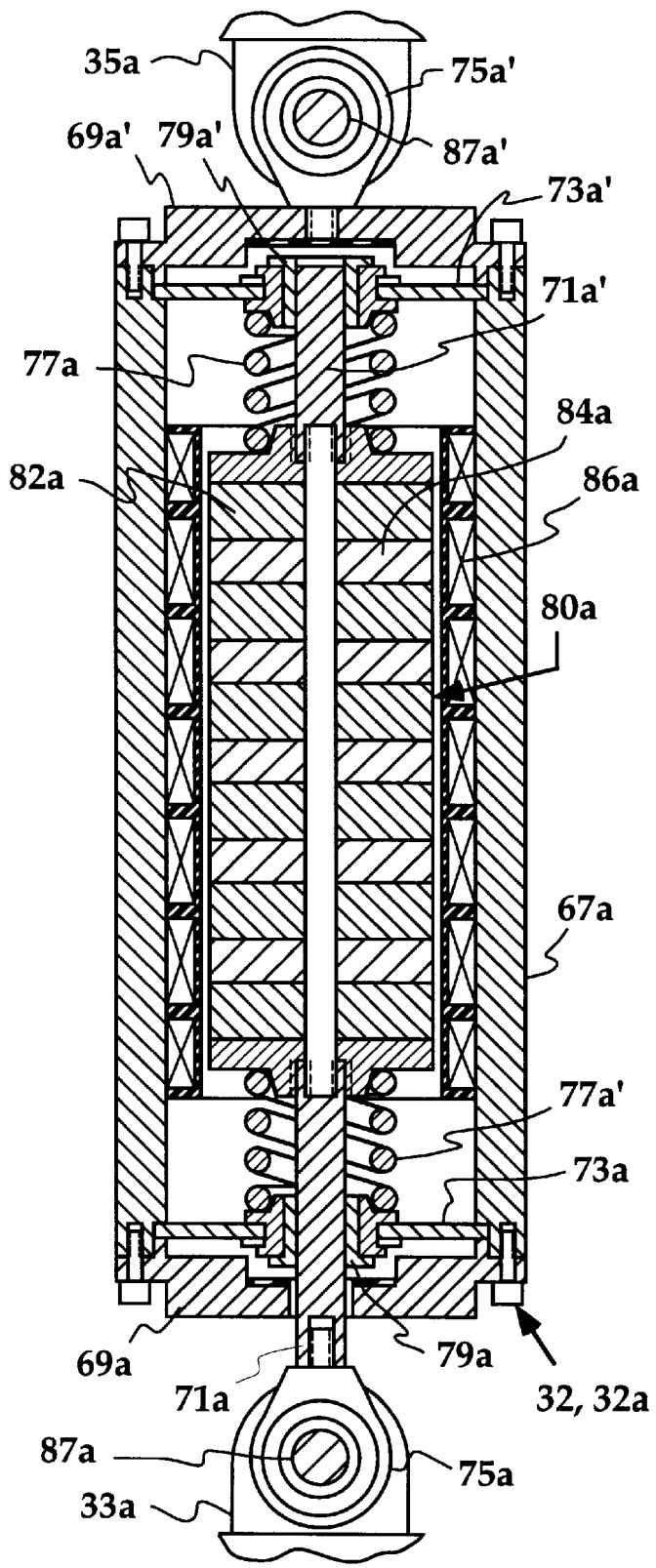
FIG. 9 is a cross-sectioned side view of one embodiment of active actuator.

FIG. 9 illustrates a cross-sectional view of the active actuator preferably for use with the systems described with reference to FIG. 1 and FIG. 3. The actuator 32, 32a is comprised of cylindrical body 67a, end caps 69a, 69a' secured to body 67a, an internal magnet and pole assembly 80a mounted for reciprocal motion within body 67a where the magnet and pole assembly 80a is connected to rods 71a, 71a' which interconnect to flex plates 73a, 73a' and are slidably received in bushings 79a, 79a'. Multiple circumferentially wound coils (ex. coil 86a) are arranged along the inner walls of the body 67a and are axially aligned with their respective pole pieces (ex. pole piece 84a). When the coils are electrically energized with an oscillatory current, a dynamic magnetic field is created about each coil which interacts with the various static magnetic fields generated by permanent ring magnets (ex. magnet 82a). This causes the pole and magnet assembly 80a to oscillate within the body 67a and impart active forces between itself and the body 67a. This resultantly produces forces between the rod ends 75a, 75a'. Springs 77a, 77a' preferably carry the loads between the ends of pole and magnet assembly 80a and the flex plates 73a, 73a'. This actuator 32, 32a has overload protection means to accommodate shocks and resultant motions between the rolls of about 0.25 inch by accommodating that deflection in the springs 77a, 77a' and flex plates 73a, 73a'. However, greater motion may be occasionally required between the rolls to which the force generators 32, 32a are interconnected. This may be caused by a large clump of medium passing between the rolls (ex. rolls 22, 24 of FIG. 1) which causes jumping of at least one of the rolls (ex. 24). To accommodate this jumping, and protect the force generators 32, 32a from these transient large deflections and concomitant loads, additional means are provided for overload protection. One such means for providing such protection is by use of a shear pin 87a and/or 87a' which exhibits shear load characteristics such that the force generator (ex. 32, 32a) detaches from the bracketry 33a or 35a (FIG. 1) upon exceeding a predetermined load. Although the shear pin or pins 87a, 87a' would have to be replaced, the force generator 32, 32a would come away unscathed.

Figure 10:
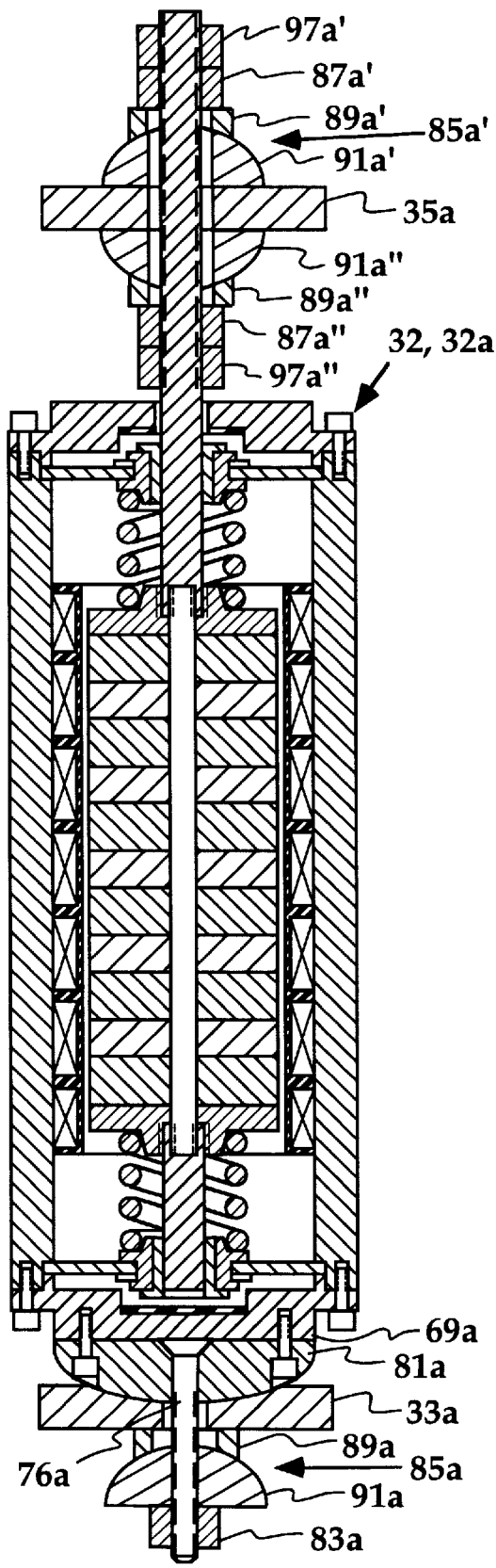
FIG. 10 is a cross-sectioned side view of another embodiment of active actuator.

FIG. 10 illustrates an optional means for providing overload protection, as well as a means for accommodating misalignment, thereby minimizing both axial and side loads imparted to the actuator 32, 32a. In this embodiment, the end cap 69a of actuator 32, 32a is bolted to a connector plate 81a at the lower end thereof. A fastener 76a including shear nut 83a secures actuator 32, 32a and pivot assembly 85a to the bracket 33a. The shear nut 83a is selected such that its threads will shear upon exceeding a predetermined amount of axial load, thus, protecting the actuator 32, 32a from being overloaded axially. The pivot assembly 85a provides the means for allowing misalignment or pivoting of the actuator 32, 32a relative to the bracket 33a. The pivot assembly 85a is comprised of a convex washer 91a and a concave washer 89a each which include matching spherical surfaces. Likewise, curved spherical surfaces of connector plate 81a interact with like shaped recess formed in bracket 33a. These curved surfaces interact in sliding engagement to allow limited pivotal misalignment between the actuator 32, 32a and bracket 33a. This misalignment capability relative to the bracket 35a minimizes side loads to the actuator 32, 32a during installation. Similar misalignment means are shown on the other end of actuator 32, 32a, except that concave washers 89a', 89a" and convex washers 91a', 91a" are positioned in a reversed orientation. Jam nuts 87a', 87a" axially secure the assembly 85a' together. Locking nuts 97a', 97a" may be used to prevent backing off of the jam nuts 87a', 87a" during operation.

In summary, it should be apparent from the foregoing that the present invention comprises a novel system for control of vibration within one or more rolls within a process line including rolls, and more particularly, within a calender or supercalender. In one aspect, the calender for calendering a medium comprises a calender frame, a plurality of rolls mounted or affixed relative to the frame through a plurality of bearing members rotatably supporting said plurality of rolls, and a plurality of force generators which provide dynamic control forces of the appropriate amplitude, phase, and frequency to control dynamic vibration between the plurality of rolls. The dynamic vibration is controlled to provide cancellation forces to minimize vibration induced thickness variations of the calendered product, for example, paper, plastic, steel, aluminum, other metals or alloys (sheet or billet), polymer film, laminates, magnetic tape, etc. The force generator preferably includes controllability, such as an active force actuator (ex. electromechanical or hydraulic), an Active Vibration Absorber (AVA), an Adaptive Tuned Vibration Absorber (ATVA), or the like.

While several embodiments including the preferred embodiment of the present invention have been described in detail, various modifications, alterations, changes, and adaptations to the afore-mentioned may be made without departing from the spirit and scope of the present invention defined in the appended claims. It is intended that all such modifications, alterations, and changes be considered part of the present invention.

What is claimed is:

1. An apparatus for calendering a medium, comprising:
   (a) a frame,
   (b) first and second calendar rolls rotatably mounted relative to said frame and forming a nip between which the medium is inserted,
   (c) at least one force generator for providing cancelling vibrational forces to control dynamic vibration between said first and second rolls, and
   (d) means for controlling said at least one force generator to adjust said cancelling vibrational forces applied between said first and second rolls thereby controlling thickness variations in the medium which occur due to relative vibration between said first and second rolls.

2. An apparatus for calendering a medium of claim 1 further including:
   (a) at least one error sensor for providing an error signal correlated to a vibration condition of at least one of said first and second calender rolls, and
   (b) said means for controlling said at least one force generator includes a controller which processes said error signal and supplies a control signal to said at least one force generator.

3. An apparatus of claim 2 wherein said at least one force generator further comprises an active generator device interconnected to at least one of said first and second calender rolls.

4. An apparatus of claim 2 wherein said at least one force generator further comprises an active generator device interconnected between said first and second calender rolls.

5. An apparatus of claim 2 wherein said at least one force generator is oriented to provide vertical control forces to control relative vertical vibration between said first and second calender rolls.

6. An apparatus of claim 2 wherein said at least one force generator is oriented to provide lateral control forces to control relative lateral vibration between said first and second calender rolls.

7. An apparatus of claim 2 wherein said at least one force generator provides control forces to control vibration of at least one of said first and second calender rolls in both a vertical and lateral direction.

8. An apparatus of claim 2 wherein said at least one force generator canted relative to a vertical plane at a predetermined angle.

9. An apparatus of claim 2 wherein said at least one force generator accommodates static displacements between said first calender roll and said second calender roll.

10. An apparatus of claim 2 wherein said at least one force generator includes means for providing overload protection.

11. An apparatus of claim 2 wherein said at least one force generator further comprises an actively-controlled hydraulic cylinder interconnected to at least one of said first and second calender rolls.

12. An apparatus of claim 2 wherein said at least one force generator further comprises an active vibration absorber interconnected to at least one of said first and second calender rolls.

13. An apparatus of claim 2 wherein said at least one force generator further comprises an adaptive vibration absorber interconnected to at least one of said first and second calender rolls.

14. An apparatus of claim 2 wherein said at least one error sensor further comprises an accelerometer providing acceleration of at least one of said first and second calender rolls.

15. An apparatus of claim 2 wherein said at least one error sensor further comprises a first accelerometer providing a first acceleration signal representative of acceleration of said first calender roll and a second accelerometer providing a second acceleration signal representative of acceleration of said second calender roll.

16. An apparatus of claim 2 wherein said at least one error sensor is a relative vibration sensor interconnected to at least one of said first and second calender rolls.

17. An apparatus of claim 2 wherein said at least one error sensor is a caliper sensor providing a signal correlated to a thickness of the medium calendered between said first and said second calender rolls.

18. An apparatus of claim 2 wherein the medium calendered is paper and said first and second calender rolls are stacked atop one another.

19. An apparatus of claim 2 wherein said controller also processes at least one reference signal representative of a rotational speed of at least one of said first and second calender rolls.

20. An apparatus of claim 19 wherein said controller processes said at least one reference signal and said at least one error signal according to a feedforward adaptive algorithm.

21. An apparatus of claim 2 wherein said means for controlling is operative to actuate said at least one force generator such that a vibration coinciding with a fundamental rotational frequency of at least one of said first and second calender rolls is controlled.

22. An apparatus of claim 2 wherein said means for controlling is operative to actuate said at least one force generator such that a vibrational harmonic of a fundamental rotational frequency of at least one of said first and second calender rolls is controlled.

23. An apparatus of claim 2 wherein said means for controlling is operative to actuate said at least one force generator such that a fundamental rotational frequency and a harmonic of said fundamental rotational frequency of at least one of said first and second calender rolls are controlled.

24. An apparatus for calendering a medium, comprising:
   (a) a frame,
   (b) at least two calender rolls rotatably mounted relative to said frame and located adjacent to one another so as to form at least one nip and,
   (c) at least one reference sensor for providing at least one reference signal synchronized with a rotational speed of at least one of said at least two calender rolls,
   (d) at least one error sensor for providing at least one error signal correlated to relative vibration between at least two of said at least two calender rolls,
   (e) a controller for processing said at least one error and reference signals and producing at least one control signal, and
   (f) at least one controllable force generator responsive to said at least one control signal for providing at least one control force to control dynamic vibration between said at least two calender rolls to control vibration induced thickness variations in said medium.

25. An apparatus for calendering a medium, comprising:
   (a) a calender frame,
   (b) a first calender roll supported for rotatable movement relative to said frame,
   (c) a second calender roll also supported for rotatable movement relative to said frame, said second calender roll being mounted so as to form a nip between said first and second calender rolls which receives the medium,
   (d) error sensor means for deriving a first error signal correlated to vertical vibration between said first and second calender rolls and a second error signal correlated to lateral vibration between said first and second calender rolls,
   (e) reference sensor means for deriving a reference signal correlated to a rotational speed of at least one of said first and second calender rolls,
   (f) a controller for processing said error signal correlated to said vertical and lateral vibration and said reference signal and producing a control signal, and
   (g) controllable force generator means responsive to said control signal for providing both vertical and lateral dynamic forces to control both vertical and lateral dynamic vibration between said first and second calender rolls thereby controlling thickness variations in the medium resulting from relative vibration between said first and second calender rolls.

26. An apparatus for calendering a medium, comprising:
(a) a frame,
(b) a plurality of rolls rotatably mounted relative to said frame, and
(c) at least one controllable vibration absorber interconnected to at least one of said plurality of rolls which provides control forces to control dynamic vibration between said plurality of rolls thereby controlling vibration induced thickness variations within said medium, said at least one controllable vibration absorber including a tuning mass flexibly suspended by a flexible member and drive means for dynamically vibrating said tuning mass.

27. An apparatus for calendering a medium, comprising:
(a) a frame,
(b) a plurality of rolls rotatably mounted relative to said frame, and
(c) at least one hydraulic servo-actuator interconnected to at least one of said plurality of rolls which servo-actuator provides active cancelling control forces to control dynamic vibration between said plurality of rolls thereby controlling vibration induced thickness variations within said medium.

28. An apparatus for calendering a medium, comprising:
(a) a frame,
(b) a plurality of rolls rotatably mounted relative to said frame, and
(c) at least one active force generator device interconnected between at least two of said plurality of rolls to provide active cancelling control forces to control vibration between said plurality of rolls thereby controlling vibration induced thickness variations within said medium, said at least one active force generator device including a body, an assembly suspended relative to said body, and means for oscillating said assembly relative to said body.

29. A method of controlling the thickness of a calendered medium, comprising the steps of:
(a) feeding a medium between a nip formed between two calender rolls,
(b) generating from a reference sensor a reference signal correlated to rotational speed of at least one of said two calender rolls,
(c) generating from at least one error sensor an error signal representative of residual vibration between said two calender rolls,
(d) processing said reference signal and said error signal within a controller to produce a control signal, and
(e) controlling a force generator responsive to said control signal for providing force to control dynamic vibration between said two calender rolls to control thickness variations within said medium.

* * * * *